(12) United States Patent
Chang

(10) Patent No.: US 7,256,912 B2
(45) Date of Patent: Aug. 14, 2007

(54) ADAPTIVE GENERATION OF PERCEPTUALLY UNIFORM SAMPLES FOR PRINTER CHARACTERIZATION

(75) Inventor: James Zhixin Chang, Vancouver, WA (US)

(73) Assignee: Sharp Laboratories of America, Inc, Camas, WA (US)

(*) Notice: Subject to any disclaimer, the term of this patent is extended or adjusted under 35 U.S.C. 154(b) by 910 days.

(21) Appl. No.: 10/606,056

(22) Filed: Jun. 25, 2003

(65) Prior Publication Data

US 2004/0263876 A1 Dec. 30, 2004

(51) Int. Cl.
*G06F 15/00* (2006.01)

(52) U.S. Cl. .................. 358/1.9; 358/504; 358/518; 347/15

(58) Field of Classification Search ........... 358/1.9, 358/504, 518, 520; 382/162, 165, 167; 347/15
See application file for complete search history.

(56) References Cited

U.S. PATENT DOCUMENTS

| 4,929,978 | A | * | 5/1990 | Kanamori et al. | 358/520 |
| 5,243,414 | A | * | 9/1993 | Dalrymple et al. | 358/518 |
| 5,612,902 | A | | 3/1997 | Stokes | 364/526 |
| 6,072,589 | A | | 6/2000 | Rozzi | 358/1.9 |
| 6,411,318 | B1 | | 6/2002 | Sawano et al. | 347/188 |
| 6,441,923 | B1 | | 8/2002 | Balasubramanian et al. | 358/3.23 |
| 6,480,299 | B1 | * | 11/2002 | Drakopoulos et al. | 358/1.9 |
| 7,116,452 | B2 | * | 10/2006 | Han et al. | 358/504 |
| 2001/0038459 | A1 | * | 11/2001 | Mahy | 358/1.9 |
| 2002/0181018 | A1 | | 12/2002 | Hung | 358/1.15 |
| 2003/0189716 | A1 | * | 10/2003 | Tsuji et al. | 358/1.9 |
| 2004/0184658 | A1 | * | 9/2004 | Inoue | 382/162 |
| 2005/0190389 | A1 | * | 9/2005 | Tanaka | 358/504 |
| 2005/0195233 | A1 | * | 9/2005 | Tanaka | 347/15 |
| 2006/0126139 | A1 | * | 6/2006 | Tanaka | 358/518 |

* cited by examiner

*Primary Examiner*—Kimberly Williams
(74) *Attorney, Agent, or Firm*—Law Office of Gerald Mallszewski; Gerald Mallszewski (57) ABSTRACT

A method is provided for adaptively generating perceptually uniform printer characterization samples in a three-dimensional (3-D) signal space. The method comprises: generating lines, each including a plurality of samples, in a printer 3-D signal space; printing signal space color targets; measuring the signal space color targets; generating lines with a plurality of perceptually uniform samples; generating polygon shapes in the 3-D signal space from the perceptually uniform sampled lines; calculating addition perceptually uniform sample points associated with each polygon; and, generating a final target in the printer 3-D signal space using the calculated perceptually uniform sample points. In one aspect, generating lines, includes: for each line, generating a metric distance function; creating a plurality of perceptually uniform samples on the function output axis; and, using the inverse of the metric distance function, mapping perceptually uniform samples onto the line.

26 Claims, 5 Drawing Sheets

ADAPTIVE GENERATION OF PERCEPTUALLY UNIFORM SAMPLES FOR PRINTER CHARACTERIZATION

BACKGROUND OF THE INVENTION

1. Field of the Invention

This invention generally relates to color printer and digital imaging technology and, more particularly, to a method for calibrating a printer three-dimensional signal space into perceptually uniform gradations.

2. Description of the Related Art

Every color printer or color imaging system operates by defining a color space. Although different systems exist for defining color, one common system is the three dimensional signal space forming a cube with a black (O) vertex, a white (W) vertex, the three primary color vertices; red (R), green (G), and blue (B), and three secondary vertices; cyan (C), magenta (M), and yellow (Y). This color space is known as RGB or CMY. Other definitions of color space, such as CMYK, can be translated into the above-described system.

However, the color space definitions between different printers need not necessarily be the same. Alternately stated, a pixel with a specific color space definition does not necessarily appear the same when printed from different printers. For example, an imaging software application loaded on a personal computer (PC) may intend to create a pixel defined as 10% red, 10% green, and 80% blue (10, 10, 80). This pixel information is sent to two different color printers associated with the PC. When printed on the first printer, the pixel may appear as (10, 10, 80), as intended. However, due to variances between manufactures, for example, the pixel at the second printer may actually appear as (10, 15, 75) on the first printer when objectively measured. Alternately stated, the color instructions sent by the PC are device dependent. In this circumstance, a perfect match between intended and actual pixel colors can only occur if RGB color space profile of both printers can be derived, and a conversion invented to translate between the PC color space and the printer color space.

In generating color conversion tables for printers, there is a need to extensively sample the device color space (such as RGB, CMY, or CMYK) to create a printer target. It is highly desirable to sample the device color space in such a way that the output colors are more or less evenly distributed in a perceptual uniform color space, such as the CIELAB space. However, different types of printers have different characteristics and it is not possible to have one target that works equally well for all types of printers.

It would be advantageous if a printer's color, or signal space could be calibrated to create a perceptually uniform color space.

It would be advantageous if a printer's color space profile could be easily generated, to permit the printer to render perceptually consistent colors.

SUMMARY OF THE INVENTION

The present invention solves the above-mentioned problems by using a fixed preliminary target that contains a small fraction of the total number of color samples on the final target. By measuring the CIELAB values of samples on the preliminary target, and calculating additional sample points, a final target can be constructed with a large number of color patches that sample the CIELAB space approximately uniformly.

It should be understood that there is a difference between signal space and perceptual uniform space. Signal space is RGB or CMY, which represents the signals that drive a printer, for example. Perceptual uniform space, such as the CIELAB space, has nothing to do with any particular device, but is related to the human visual system. The signal space of a device is usually not perceptually uniform, and this fact makes the present invention useful. That is, a uniform sampling of the signal space will, most likely, not reveal a uniform distribution in perceptual space. To find out how samples specified in the signal space are distributed in a perceptually uniform space, printed samples must be measured. The objective is to sample the 3-D signal space, for example a cube, most likely a non-uniformly in the signal space, so that a new set of samples can be derived in the signal space that are uniformly distributed in the perceptual space.

One well-known perceptual color fidelity metric is International Commission on Illumination (CIE) L*a*b* standard color space specification. L is brightness, a is the red-green channel, and b is the yellow-blue channel. To measure a perceptual difference between two sources, the spectral power distribution of the sources is converted to XYZ representations, which represents the spectral power sensitivities of the three cones on the human retina. Then, the XYZ values are transformed into an L, a, b space. Uniform distances in this space correspond to uniform perceptual differences. That is, the space is a perceptually uniform space. The perceptual difference between the two sources or targets can be calculated by taking the Euclidean distance of the two in this L, a, b space.

Accordingly, a method is provided for adaptively generating perceptually uniform printer characterization samples in a three-dimensional (3-D) signal space. The method comprises: generating lines, each including a plurality of samples, in a printer 3-D signal space; in response to the line samples, printing signal space color targets; measuring the signal space color targets; from the signal space color targets, generating lines with a plurality of perceptually uniform samples; generating polygon shapes in the 3-D signal space from the perceptually uniform sampled lines; calculating addition perceptually uniform sample points associated with each polygon; and, generating a final target in the printer 3-D signal space using the calculated perceptually uniform sample points.

In one aspect of the invention, generating lines in a printer 3-D signal space includes generating 19 lines. That is, lines are generated between the black (O), white (W), blue (B), cyan (C), green (G), magenta (M), red (R), and yellow (Y) vertices in RGB and CMY color space.

In other aspects, generating lines, each including a plurality of perceptually uniform samples includes: for each line, generating a metric distance function having an input axis to accept signal space samples and an output axis; in response to the metric distance function, creating a plurality of perceptually uniform samples on the output axis; and, using the inverse of the metric distance function, mapping the third plurality of perceptually uniform samples onto the line.

In some aspects, generating polygon shapes in 3-D signal space from the perceptually uniform sampled lines includes partitioning a cube representation of 3-D signal space into 6 tetrahedra bounded by the 19 perceptually uniform sampled lines. That is, each tetrahedron is formed with a black (O) vertex, a white (W) vertex, a primary vertex (P) selected from the group including red (R), green (G), and blue (B), and a secondary vertex (S) selected from the group including cyan (C), magenta (M), and yellow (Y).

In some aspects, generating lines, each including a plurality of perceptually uniform samples, includes generating n samples per line. Then, calculating addition perceptually uniform sample points associated with each polygon includes generating N samples per tetrahedron as follows:

$$N=n((n+1)(2n+1)/12)+n(n+1)/4;$$

inclusive of the n samples per line segment.

More specifically, calculating addition perceptually uniform sample points associated with each polygon includes: generating $(n+1)/2$ successively smaller layers for each tetrahedron; and, calculating the location of additional perceptually uniform samples on each of the layers.

Additional details of the above-described method are presented below.

DETAILED DESCRIPTION OF THE PREFERRED EMBODIMENTS

Figure 1:
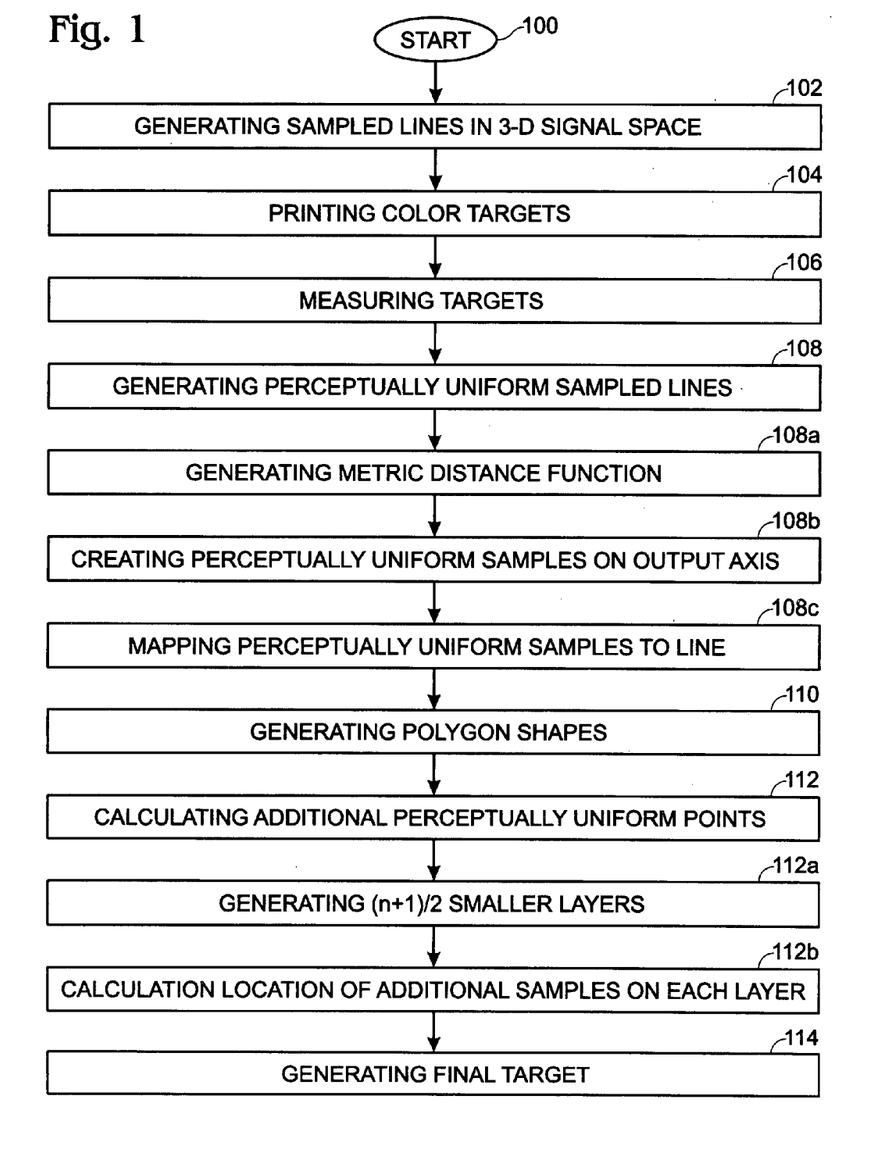
FIG. 1 is a flowchart illustrating the present invention method for adaptively generating perceptually uniform printer characterization samples in a three-dimensional (3-D) signal space.

FIG. 1 is a flowchart illustrating the present invention method for adaptively generating perceptually uniform printer characterization samples in a three-dimensional (3-D) signal space. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 100.

Step 102 generates a first plurality lines, each including a second plurality of samples, in a printer 3-D signal space. Step 104, in response to the line samples, prints signal space color targets. Step 106 measures the signal space color targets.

The samples on the lines provide a set of three-tuple RGB specifications. For example, for samples on a line from black to red (R), we have (0, 0, 0), (10, 0, 0), (20, 0, 0), ..., (100, 0, 0), where the first number specifies the percentage of R, second the percentage of G, and third the percentage of B. A graphic program such as Photoshop can be used to make an electronic file, for example a TIFF file, with a number of color patches. Alternately, a software program can be used to directly output such a TIFF file, without the need for a graphic program. The image in the file consists of several square color patches. For example, the first patch may have an RGB value of (0, 0, 0), the second a value of (10, 0, 0), and so on.

This TIFF target file is sent to a printer to obtain the output. The output is the printed sheet of paper with square color patches. There are several scenarios on how the printer handles the target after it is received. It may directly use the R, G, and B, values on the graphic file to drive the print engine, to generate a unique mixture of colorants or inks to be put on paper for a color patch. More likely, the printer may: first, convert the RGB specification uniquely to a different specification, such as a CMY specification, a CMYK specification, or some other like specification; and, then, use that other specification to drive the printer. This is because the inks, toners, or colorants are really specified in terms of CMY, CMYK, or CMYK+Orange+Green, and so on, inside the print engine. However, the present invention conversion process is unique in that it treats the printer as a "black box", and the RGB input treated as a specification to the printer.

After obtaining the printed sheet of paper, an objective color measurement device can be used, having a X-Y table that permits it to traverse through all the color patches, to obtain the corresponding CIELAB values. The measuring device can be controlled by a computer through a software application. For example, the application may convert the measured CIELAB values back to the correct color and display them on a computer monitor. After the measurement is done (or all the color patched are traversed on the X-Y table), the application provides a text file recording the measured CIELAB values for all the color patches.

Step 108, from the signal space color targets, generates a first plurality of lines, each line including a plurality of perceptually uniform samples. Step 110 generates polygon shapes in the 3-D signal space from the perceptually uniform sampled lines. Step 112 calculates addition perceptually uniform sample points associated with each polygon. Step 114 generates a final target in the printer 3-D signal space using the calculated perceptually uniform sample points.

Figure 2:
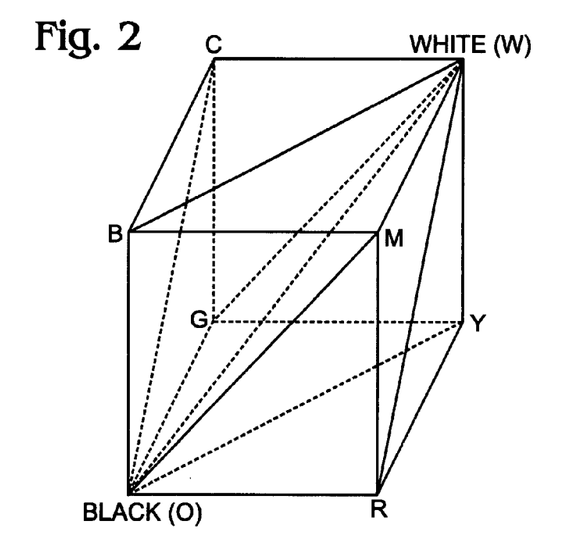
FIG. 2 is a diagram illustrating vertices connected by lines in a 3-D signal space.

FIG. 2 is a diagram illustrating vertices connected by lines in a 3-D signal space. In some aspects of the method, generating a first plurality lines in a printer 3-D signal space in Step 102 includes generating 19 lines. For example, lines are generated between the black (O), white (W), blue (B), cyan (C), green (G), magenta (M), red (R), and yellow (Y) vertices in RGB or CMY color space. In other aspects, Step 102 generates lines with a second plurality of samples uniformly separated in the 3-D signal space. Note that although these samples are uniformly separated in the 3-D signal space, the uniformly separation need not be a perceptually uniform separation.

Figure 3:
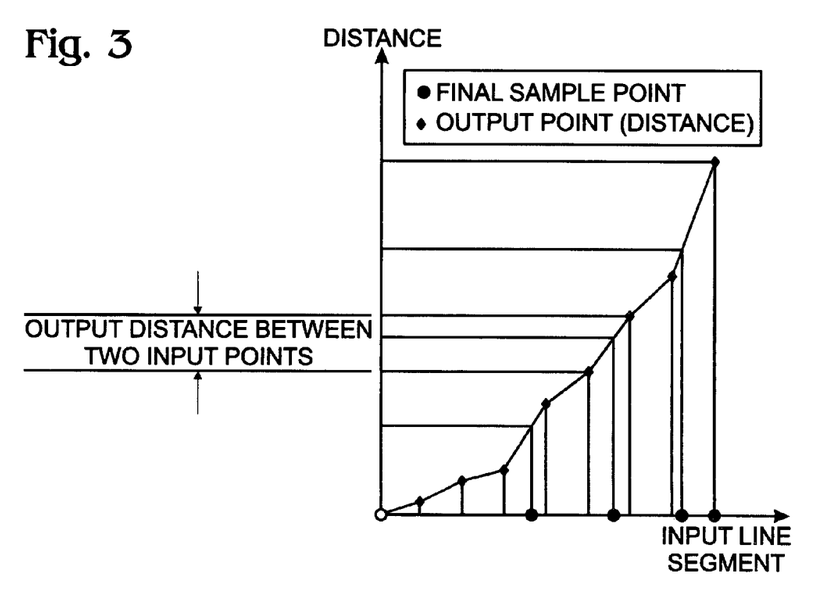
FIG. 3 is a graph depicting a one-dimensional (1-D) distance function for generating a 1-D perceptually uniform sample distribution.

FIG. 3 is a graph depicting a one-dimensional (1-D) distance function for generating a 1-D perceptually uniform sample distribution. In some aspects, generating a first plurality of lines, each including a plurality of perceptually uniform samples in Step 108 includes substeps. Step 108a, for each line, generates a metric distance function having an input axis to accept signal space samples and an output axis. Step 108b, in response to the metric distance function, creates a third plurality of perceptually uniform samples on the output axis. Step 108c using the inverse of the metric distance function, maps the third plurality of perceptually uniform samples onto the line.

In some aspects, forming a first plurality of lines differentiated into a third plurality of perceptually uniform samples in Step 108 includes generating 1 black-white (OW) line with samples differentiated by brightness (L). Step 108 may generate 6 primary-to-secondary lines with samples differentiated by a red-green channel (a) and a yellow-blue channel (b). Further, 6 lines may be generated with a black (O) vertex and 6 lines with a white (W) vertex, each of the 12 lines having samples differentiated by L, a, b.

Figures 4A, 4B:
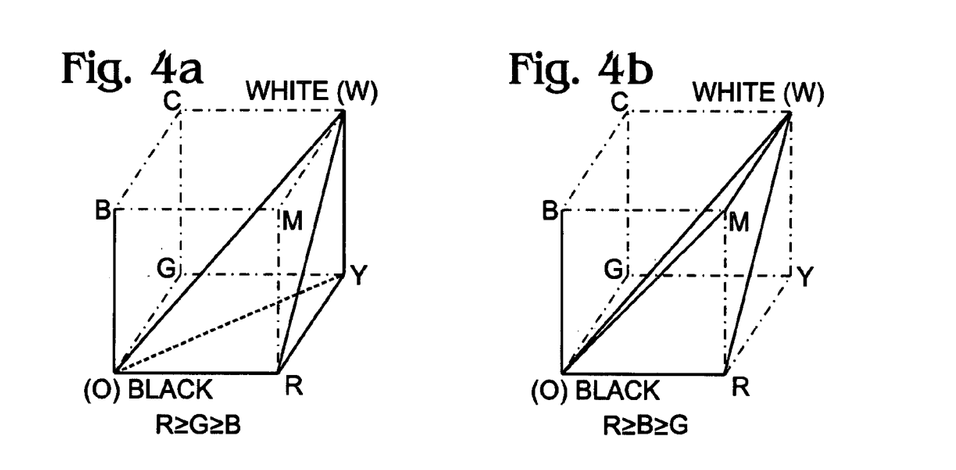
FIGS. 4a through 4f depict an exemplary tetrahedron partitioning of the 3-D signal space.
Figures 4C, 4D:
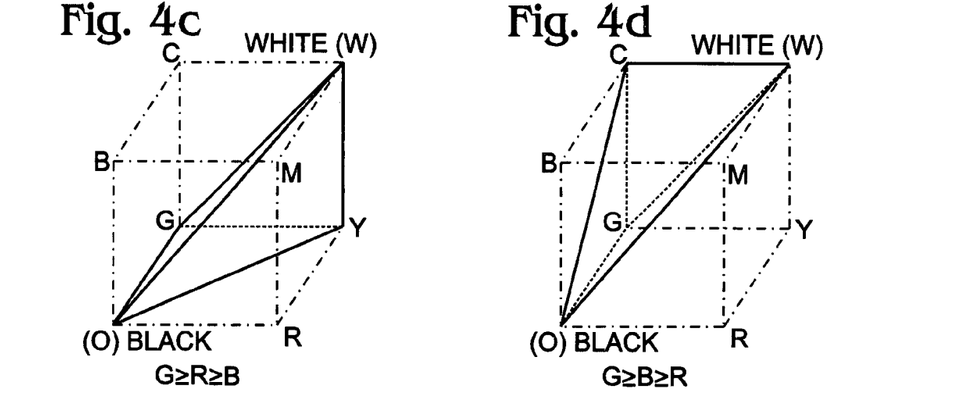
Figures 4E, 4F:
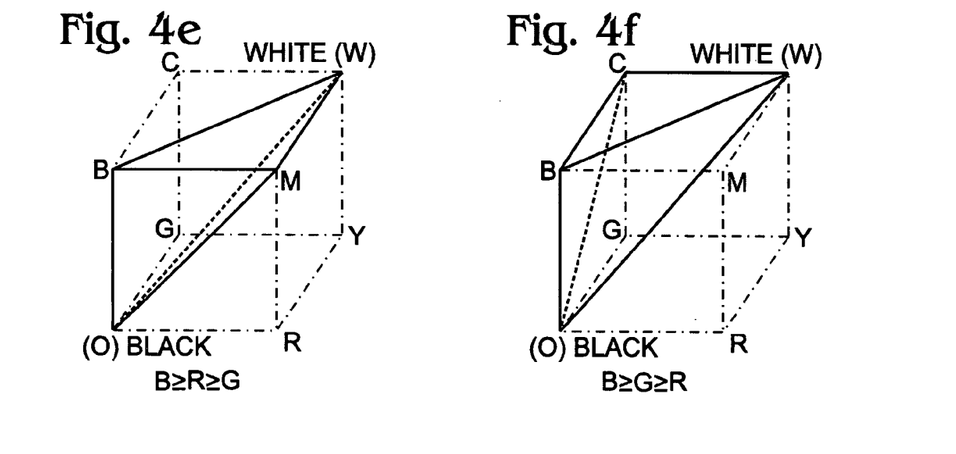

FIGS. 4a through 4f depict an exemplary tetrahedron partitioning of the 3-D signal space. That is, in some aspects, generating polygon shapes in 3-D signal space from the perceptually uniform sampled lines in Step 110 includes partitioning a cube representation of 3-D signal space into 6 tetrahedra bounded by the 19 perceptually uniform sampled lines. That is, each tetrahedron has with a black (O) vertex, a white (W) vertex, a primary vertex (P) selected from the group including red (R), green (G), and blue (B), and a secondary vertex (S) selected from the group including cyan (C), magenta (M), and yellow (Y). For example, as shown in FIG. 4a, the tetrahedron has the O, W, R, and Y vertices. Note that it is possible to partition the 3-D signal space into other polygon shapes besides tetrahedrons. For example, a five-sided polygon shape (not shown) can be used. The present invention is not limited to any particular polygon shape. However, a tetrahedron shape is used in the following examples to illustrate the invention.

Returning to FIG. 1, in some aspects, generating a first plurality of lines, each including a plurality of perceptually uniform samples in Step 108 includes generating n samples per line. Then, calculating addition perceptually uniform sample points associated with each polygon in Step 112 includes generating N samples per tetrahedron as follows:

$$N = n((n+1)(2n+1)/12) + n(n+1)/4;$$

inclusive of the n samples per line segment. That is, N includes the samples generated in Step 108, as well as the ones calculated in Step 112.

Figure 5:
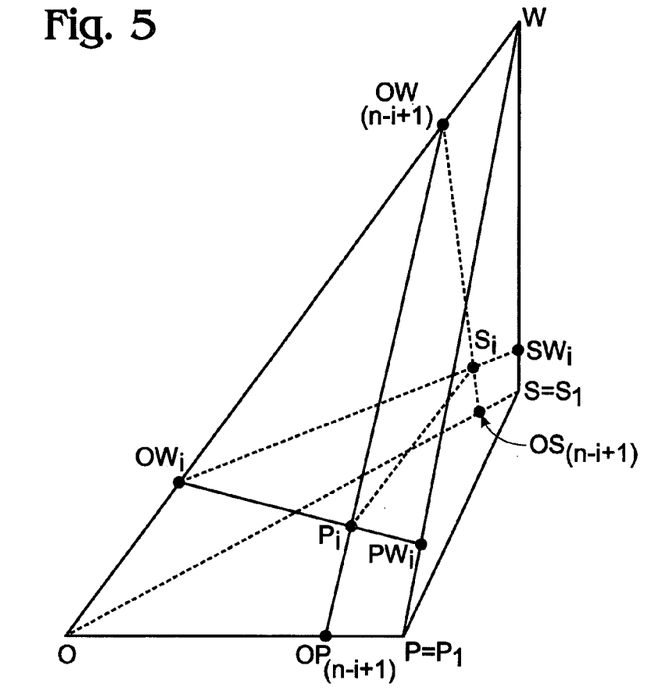
FIG. 5 is a diagram depicting an exemplary process of dividing a tetrahedron's sample points into layers.

FIG. 5 is a diagram depicting an exemplary process of dividing a tetrahedron's sample points into layers. In one aspect, calculating addition perceptually uniform sample points associated with each polygon in Step 112 includes substeps. Step 112a generates (n+1)/2 successively smaller layers for each tetrahedron. Step 112b calculates the location of additional perceptually uniform samples on each of the layers. In some aspects, generating a final target in the printer 3-D signal space using the calculated perceptually uniform sample points in Step 114 includes calculating $n^3$ sample points.

Calculating the location of additional perceptually uniform samples on each of the layers in Step 112b may include substeps (not shown). Step 112b1 defines each layer as having two adjoining triangular faces. Note that for the outer most layer (i=1), Step 112b1 finds the two triangular faces as being faces OPS and WPS of the tetrahedron. Step 112b2 finds a common edge of the two triangular faces connecting a first vertex (Pi) on the OPW face to a second vertex (Si) on the OSW face of the tetrahedron. Step 112b3 finds a third and a fourth vertices, both on the OW line.

In some aspects, finding a third and fourth vertices in Step 112b3 includes, for an inner layer (i>1), the third vertex being the i-th sample ($OW_i$) on the OW line, with respect to black (O), and the fourth vertex being the i-th sample ($OW_{(n-i+1)}$) on the OW line, with respect to white (W). Finding a common edge of the two triangular faces connecting a first vertex ($P_i$) on the OPW face to a second vertex ($S_i$) on the OSW face of the tetrahedron (Step 112b2) includes substeps (not shown). Step 112b2a obtains $P_i$ by the intersection between the line connecting the i-th sample from W on the WO line and the i-th sample from P on the OP line. Step 112b2b obtains $S_i$ by the intersection between the line connecting the i-th sample from W on the WO line and the i-th sample from S on the OS line.

Alternately stated, in some aspects, Step 112b calculates the location of additional perceptually uniform samples on each of the layers by: calculating perceptually uniformly distributed samples on each edge of the triangular faces; and, calculating perceptually uniformly distributed samples on the interior of the two triangle faces from the samples on the edges. That is, Step 112b, for the outer most layer (i=1), uses sample points on the perceptually uniform sampled lines to define the edges of the tetrahedron triangular faces.

Figure 6A:
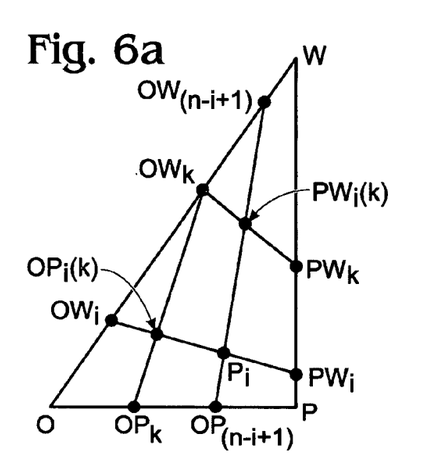
FIGS. 6a and 6b are diagrams illustrating the determination of the sample point distribution on 4 out of the 5 edges of a layer derived from the tetrahedron of FIG. 5.
Figure 6B:
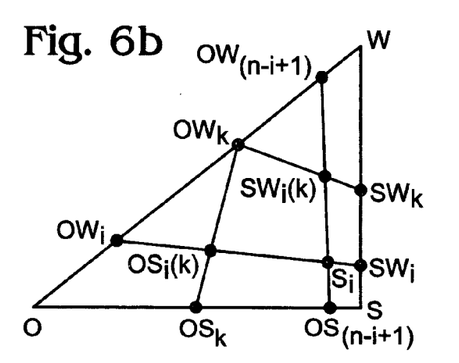

FIGS. 6a and 6b are diagrams illustrating the determination of the sample point distribution on 4 out of the 5 edges of a layer derived from the tetrahedron of FIG. 5. In some aspects, Step 112b4, for an inner layer (i>1), obtains perceptually uniformly distributed samples on $OW_i$-$P_i$ by the following procedure:

for each sample of the on the OW line between $OW_i$ and $OW_{(n-i+1)}$, finding a corresponding sample on the OP line by the following rule:

finding a k-th sample from O on the OW line corresponding to a k-th sample from O on the OP line; and, calculating the intersections of line $OW_i$-$P_i$ and the lines connecting the corresponding samples on OW and OP lines to obtain perceptually uniform sample points on $OW_i$-$P_i$.

In some aspects, Step 112b5, for an inner layer (i>1), obtains perceptually uniformly distributed samples on $OW_{(n-i+1)}$-$P_i$ by the following procedure:

for each sample on the OW line between $OW_i$ and $OW_{(n-i+1)}$, finding its corresponding sample of the PW line by the following rule:

finding a k-th sample from O on the OW line corresponding to a k-th sample from P on the PW line; and, calculating the intersections of line $OW_{(n-i+1)}$-$P_i$ and the lines connecting the corresponding samples on OW and PW lines to obtain perceptually uniform sample points on $OW_i$-$P_i$.

Step 112b6, for an inner layer (i>1), obtains perceptually uniformly distributed samples on $OW_i$-$S_i$ by the following procedure:

for each sample on the OW line between $OW_i$ and $OW_{(n-i+1)}$, finding its corresponding sample on the OS line by the following rule:

finding a k-th sample from O on the OW line corresponding to the k-th sample from O on the OS line; and, calculating the intersections of line $OW_i$-$S_i$ and the lines connecting the corresponding samples on OW and OS lines to obtain perceptually uniform sample points on $OW_i$-$S_i$.

Step 112b7, for an inner layer (i>1), obtains perceptually uniformly distributed samples on $OW_{(n-i+1)}$-$S_i$ by the following procedure:

for each sample on the OW line between $OW_i$ and $OW_{(n-i+1)}$, finding its corresponding sample on the SW line by the following rule:

finding a k-th sample from O on the OW line corresponding to a k-th sample from S on the SW line; and, calculating the intersections of line $OW_{(n-i+1)}$-$S_i$ and the lines connecting the corresponding samples on OW and SW lines to obtain perceptually uniform sample points on $OW_i$-$S_i$.

Figure 7:
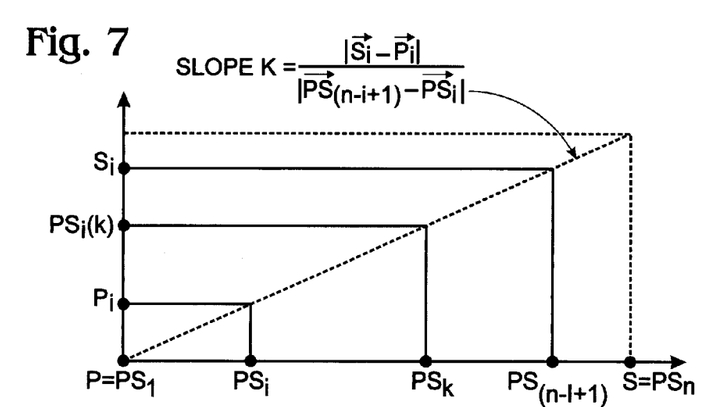
FIG. 7 is a diagram illustrating the determination of the sample point distribution of fifth edge Pi-Si of a layer derived from the tetrahedron of FIG. 5.

FIG. 7 is a diagram illustrating the determination of the sample point distribution of the fifth edge Pi-Si of a layer derived from the tetrahedron of FIG. 5. Step 112b8, for an inner layer (i>1), obtains perceptually uniformly distributed samples on $P_i$-$S_i$ being obtained by the following procedure:

plotting the samples on line PS in the signal space on a horizontal axis of a two-dimensional coordinate system, with point P on the origin;

constructing a straight line passing through the origin and having a slope equal to the ratio between the length of line segment $S_i$-$P_i$ and that of line segment $PS_{(n-i+1)}$-$PS_i$;

using the straight line as a transfer function, mapping point $PS_i$ on the horizontal axis to $P_i$ on the vertical axis, point $PS_{(n-i+1)}$ on the horizontal axis to $S_i$ on the vertical axis, and every sample on the horizontal axis between $PS_i$ and $PS_{(n-i+1)}$ on line PS to a point between $P_i$ and $S_i$ on the vertical axis; and, forming perceptually uniform mapped sample points on the vertical axis line segment $P_i$-$S_i$.

Figure 8A:
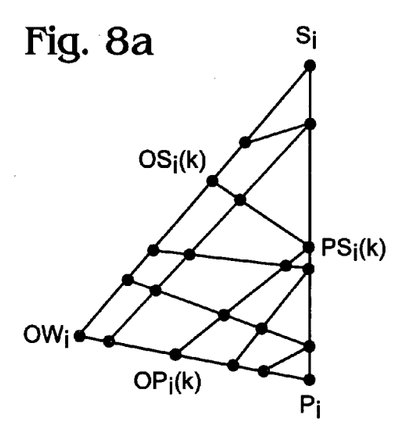
FIGS. 8a and 8b are drawings illustrating the determination of the sample point distribution on the interior of a layer derived from the tetrahedron of FIG. 5.
Figure 8B:
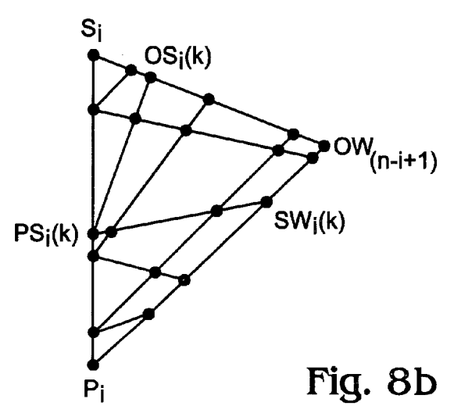

FIGS. 8a and 8b are drawings illustrating the determination of the sample point distribution on the interior of a layer derived from the tetrahedron of FIG. 5. Step 112b9 finds additional perceptually uniform sample points on the interior of each of the two adjoining triangular faces as follows:

connecting each sample point vertex on a common, first triangular face edge $P_i$-$S_i$ to sample points on a second edge $S_i$-OW and a third edge $P_i$-OW according to the following rule:

finding a k-th sample from $P_i$ on the $P_i$-$S_i$ first edge corresponding to a k-th sample from Pi on the $P_i$-OW third edge, and a k-th sample from $S_i$ on $P_i$-$S_i$ corresponding to a k-sample from $S_i$ on the $S_i$-OW second edge;

connecting corresponding sample points on the $P_i$-$S_i$ first edge and the $P_i$-OW third edge, forming a first group of lines;

connecting corresponding sample points on the $P_i$-$S_i$ first edge and the Si-OW second edge, forming a second group of lines; and, making internal interconnection points between the first and second groups of lines perceptually uniform sample points within the triangular faces. With respect to the two adjoining triangular faces, a first triangular face (FIG. 8b) has the vertices of $P_i$, $S_i$, and $OW_{(n-i+1)}$, while a second triangular face (FIG. 8a) has the vertices of $P_i$, $S_i$, and $OW_i$.

FUNCTIONAL DESCRIPTION

In generating color conversion tables for printers, there is a need to extensively sample the device color space (such as RGB, CMY, or CMYK) to create a printer target. It is highly desirable to sample the device color space in such a way that the output colors are more or less evenly distributed in a perceptual uniform color space, such as the CIELAB space. However, different types of printers have different characteristics and it is not possible to have one target that works equally well for all types of printers. This invention solves this problem by using a fixed preliminary target that contains a small fraction of the total number of color samples on the final target. By measuring the CIELAB values of the samples on this target, a final target can be automatically constructed with a large number of color patches that sample the CIELAB space approximately uniformly.

The algorithm works directly with printers having three input channels, such RGB or CMY. Device RGB space is considered to be equivalent to CMY space since R=1−C, G=1−M, and B=1−Y. By incorporating a black generation module that converts RGB or CMY signals into appropriate CMYK signals for printing, this algorithm can also be used for generating CMYK printer targets. The present invention adaptively generates printer characterization targets based on a preliminary target. This algorithm contains three major steps:

1. Generate a preliminary printer target that uniformly samples 19 line segments in the device RGB space. Print and measure the output colors in the CIELAB space. The 19 line segments to be sampled are shown in FIG. 2: a neutral (or nearly neutral) line from black (0) to white (W), lines from black (O) to the primary colors R, G, and B, lines from black (O) to secondary colors C, M, and Y, lines from primary colors R, G, and B to white (W), lines from secondary color C, M, and Y to white (W), and lines connecting a primary color with an adjacent secondary color, RM, RY, GC, GY, BC, and BM. In one implementation, 14 points are used to sample each line segment, creating a preliminary target with 266 color sample patches. The final target may contain either 9×9×9 or 12×12×12 color sample patches, for example. In general, the number of points per line segment for the preliminary target should be a little bit bigger than the number of samples per dimension of the final target. However, this is not a strict requirement.

2. With the measured CIELAB data, the specified number of samples per dimension (for example, either 9 or 12) are distributed on each of the 19 line segments in such a way that they are approximately uniformly distributed in the CIELAB space. The algorithm for accomplishing this is illustrated in FIG. 3, where the number of points per line segment in the preliminary target is 9, and the number of samples per dimension in the final target is 5, as an example. First, a function of distance versus the uniformly sampled input points on the line segment is constructed, where the increment in the "Distance" axis is a metric distance in the CIELAB space between two adjacent input points. In one implementation, the 1-D distance in L, for the line segments from black to white, is used. Since for this is a neutral (nearly neutral) segment, a and b will not contribute much to the distance. For the 6 line segments that connect a primary color to a secondary color, the 2-D distance in a and b is used since it is desirable to spread the sample points evenly around the hue circle. For the rest of the line segments, the 3-D Lab (L, a, b) distance measure is used. The choice of 1-D, 2-D, or 3-D distance measure is not a critical aspect of this algorithm. After constructing the distance function, the output distance axis is sampled uniformly using the number of samples per dimension of the final target, and using the inverse function mapping to obtain the desired final sample point distribution on the line segment in the RGB (or CMY) target space.

3. With sample points on the 19 line segments decided, sample points are obtained for distribution within or on tetrahedra constructed by 6 of these line segments. As shown in FIGS. 4a through 4f, an RGB cube can be partitioned into 6 tetrahedra. The rank ordering of RGB values of a RGB point can be used to match an RGB point with a tetrahedron. Letting $n^3$ be the number of samples for the final target (size n per dimension), the number of samples per tetrahedron is $$N_T = n(n+1)(2n+1)/12 + n(n+1)/4.$$

In one aspect of the algorithm, the sample point distribution on each triangular face of a tetrahedron is completely determined by the sample point distributions on the line segments bounding the triangle. This distribution guarantees that a face common to two tetrahedra receives the same sample point distribution from either tetrahedron. The detailed algorithm for distributing sample points on a tetrahedron is described below.

By observing the tetrahedra of FIGS. 4a through 4f, it can see that all 6 tetrahedra can be described by a generic tetrahedron with black point (O), white point (W), and a primary (R, G, or B) color, and a secondary color (C, M, or Y) as vertices. This is shown in FIG. 5, where the primary color vertex is denoted by P and the secondary color by S. The concept of sample point layers is also described in this figure. The $N_T$ sample points on a tetrahedron can be divided into $\lfloor (n+1)/2 \rfloor$ layers. The outermost layer (Layer 1) contains sample points on the two triangular faces OPS and WPS. The construction of a general inner Layer i, consisting of triangles with vertices $\{OW_i, P_i, S_i\}$ and $\{OW_{(n-i+1)}, P_i, S_i\}$, is shown in the figure, where $OW_i$ and $OW_{(n-i+1)}$ are the i-th and (n−i+1)-th sample points on OW, respectively. Point $P_i$ is obtained by the intersection of lines with end points $\{OW_i, PW_i\}$ and $\{OW_{(n-i+1)}, OP_{(n-i+1)}\}$ on the OPW plane, where $PW_i$ is the i-th sample point on PW and $OP_{(n-i+1)}$ is the (n−i+1)-th sample point on OP, respectively. Point $S_i$ is determined by the intersection of lines with end points $\{OW_i, SW_i\}$ and $\{OW_{(n-i+1)}, OS_{(n-i+1)}\}$ on the OSW plane, where $SW_i$ is the i-th sample point on SW and $OS_{(n-i+1)}$ is the (n−i+1)-th sample point on OS, respectively. For the outermost layer (Layer 1), the sample distributions on all the line segments specifying the layer are determined. For inner layers, the distribution of sample points on these line segments must be determined. Then, the sample point distribution of each layer must be determined. For the i-th layer, where $i=1,2,K, \lfloor (n+1)/2 \rfloor$, the number of sample points for each line segment is (n−2i+2) and the number of sample point on each layer is $(n-2i+2)^2$. The overall procedure of the algorithm for distributing sample points in a tetrahedron is summarized by the following pseudo-code.

```
for each of the 6 tetrahedra {
    Identify the primary and secondary vertices (P and S).
    Identify the sample distribution of each edge.
    for i = 1,2,K ,⌊(n+1)/2⌋ {
        if i ≠ 1 {
            Obtain sample distribution on the edges
            of the i-th layer.
        }
        Obtain sample distribution on the interior of the
        triangular faces of the i-th layer.
    }
}
```

The methods for obtaining the sample distribution on the edges of the i-th layer are illustrated in FIGS. 6a, 6b, and 7. The sample points on the edge with end points $\{OW_i, OW_{(n-i+1)}\}$ are just a subset of the sample points on OW, which are already determined. The process for determining the sample points on edges $\{OW_i, P_i\}$ and $\{OW_{(n-i+1)}, P_i\}$ is shown in FIG. 6a. For each sample points $OW_k$ between $OW_j$ and $OW_{(n-i+1)}$, a sample point $OP_i(k)$ is obtained on edge $\{OW_i, P_i\}$ by finding the intersection between line $\{OW_k, OP_k\}$ and the edge on the OPW plane. Similarly, sample point $PW_i(k)$ on edge $\{OW_{(n-i+1)}, P_i\}$ is obtained by finding the intersection between line $\{OW_k, PW_k\}$ and the edge. FIG. 6b illustrates a similar process for determining sample points on edges $\{OW_i, S_i\}$ and $\{OW_{(n-i+1)}, S_i\}$ on the OSW plane. The process for obtaining the sample points on the last edge $\{P_i, S_i\}$ is illustrated by FIG. 7. They are obtained by linearly mapping the sample points between the i-th and (n−i+1)-th sample points on the outer most edge PS. The slope of the linear mapping is the ratio of the length between line segments $\{P_i, S_i\}$ and $\{PS_i, PS_{(n-i+1)}\}$.

Finally, the method for obtaining the interior sample point distribution on the two triangular faces of a layer is illustrated in FIGS. 8a and 8b. As shown in FIG. 8a, the sample points on triangle $\{OW_i, P_i, S_i\}$ are obtained by intersections between lines connecting a sample point on $\{P_i, S_i\}$ with its corresponding sample point on $\{OW_i, P_i\}$ and $\{OW_i, S_i\}$, respectively. Similarly, the process of obtaining sample points on triangle $\{OW_{(n-i+1)}, P_i, S_i\}$ is illustrated in FIG. 8b.

A method has been presented for adaptively generating perceptually uniform printer characterization samples in a three-dimensional (3-D) signal space. A few examples have been presented to illustrate the invention using a particular number of vertices and lines, samples per line, polygon shapes, and a process of determining polygon inner layer sample points. However, the invention is not limited to merely these examples. Other variations and embodiments of the invention will occur to those skilled in the art.

I claim:

1. A method for adaptively generating perceptually uniform printer characterization samples in a three-dimensional (3-D) signal space, the method comprising:
    generating a first plurality lines, each including a second plurality of samples, in a printer 3-D signal space;
    in response to the line samples, printing signal space color targets;
    measuring the signal space color targets;
    from the signal space color targets, generating a first plurality of lines, each line including a plurality of perceptually uniform samples;
    generating polygon shapes in the 3-D signal space from the perceptually uniform sampled lines;
    calculating additional perceptually uniform sample points associated with each polygon; and,
    generating a final target in the printer 3-D signal space using the calculated perceptually uniform sample points.

2. The method of claim 1 wherein generating a first plurality lines in a printer 3-D signal space includes generating 19 lines.

3. The method of claim 1 wherein generating a first plurality of lines in a printer 3-D signal space includes generating lines between vertices selected from the group including black (O), white (W), blue (B), cyan (C), green (G), magenta (M), red (R), and yellow (Y) vertices in RGB and CMY color space.

4. The method of claim 1 wherein generating a first plurality lines, each including a second plurality of samples, in a printer 3-D signal space includes generating a second plurality of samples uniformly separated in the 3-D signal space.

5. The method of claim 4 wherein generating a first plurality of lines, each including a plurality of perceptually uniform samples includes:
    for each line, generating a metric distance function having an input axis to accept signal space samples and an output axis;
    in response to the metric distance function, creating a third plurality of perceptually uniform samples on the output axis; and,
    using the inverse of the metric distance function, mapping the third plurality of perceptually uniform samples onto the line.

6. The method of claim 5 wherein forming a first plurality of lines differentiated into a third plurality of perceptually uniform samples includes generating 1 black-white (OW) line with samples differentiated by brightness (L).

7. The method of claim 5 wherein forming a first plurality of lines differentiated into a third plurality of perceptually uniform samples includes generating 6 primary-to-secondary lines with samples differentiated by a red-green channel (a) and a yellow-blue channel (b).

8. The method of claim 5 wherein forming a first plurality of lines differentiated into a third plurality of perceptually uniform samples includes generating 6 lines with a black (O) vertex and 6 lines with a white (W) vertex, each of the 12 lines having samples differentiated by L, a, b.

9. The method of claim 3 wherein generating polygon shapes in 3-D signal space from the perceptually uniform sampled lines includes partitioning a cube representation of 3-D signal space into 6 tetrahedra bounded by the 19 perceptually uniform sampled lines.

10. The method of claim 9 wherein partitioning a cube representation of 3-D signal space into 6 tetrahedra bounded by the 19 perceptually uniform sampled lines includes forming each tetrahedron with a black (O) vertex, a white (W) vertex, a primary vertex (P) selected from the group including red (R), green (G), and blue (B), and a secondary vertex (S) selected from the group including cyan (C), magenta (M), and yellow (Y).

11. The method of claim 10 wherein generating a first plurality of lines, each including a plurality of perceptually uniform samples includes generating n samples per line; and, wherein calculating addition perceptually uniform sample points associated with each polygon includes generating N samples per tetrahedron as follows:

$$N=n((n+1)(2n+1)/12)+n(n+1)/4;$$

inclusive of the n samples per line segment.

12. The method of claim 11 wherein calculating additional perceptually uniform sample points associated with each polygon includes:

generating (n+1)/2 successively smaller layers for each tetrahedron; and, calculating the location of additional perceptually uniform samples on each of the layers.

13. The method of claim 12 wherein generating a final target in the printer 3-D signal space using the calculated perceptually uniform sample points includes calculating $n^3$ sample points.

14. The method of claim 12 wherein calculating the location of additional perceptually uniform samples on each of the layers includes:

defining each layer as having two adjoining triangular faces;

finding a common edge of the two triangular faces connecting a first vertex ($P_i$) on the OPW face to a second vertex ($S_i$) on the OSW face of the tetrahedron; and, defining a third and a fourth vertices, both on the OW line.

15. The method of claim 14 wherein defining a third and a fourth vertices includes, for an inner layer (i>1), defining the third vertex being the i-th sample ($OW_i$) of the on the OW line, with respect to black (O), and the fourth vertex being the i-th sample ($OW_{(n-i+1)}$) on the OW line, with respect to white (W); and, wherein finding a common edge of the two triangular faces connecting a first vertex ($P_i$) on the OPW face to a second vertex ($S_i$) on the OSW face of the tetrahedron includes:

obtaining $P_i$ by the intersection between the line connecting the i-th sample from W on the WO line and the i-th sample from P on the OP line; and, obtaining $S_i$ by the intersection between the line connecting the i-th sample from W on the WO line and the i-th sample from S on the OS line.

16. The method of claim 15 wherein calculating the location of additional perceptually uniform samples on each of the layers includes:

calculating perceptually uniformly distributed samples on each edge of the triangular faces; and, calculating perceptually uniformly distributed samples on the interior of the two triangle faces from the samples on the edges.

17. The method of claim 16 wherein calculating the location of additional perceptually uniform samples on each of the layers includes, for the outer most layer (i=1), using sample points on the perceptually uniform sampled lines to define the edges of the tetrahedron triangular faces.

18. The method of claim 16 wherein calculating the location of additional perceptually uniform samples on each of the layers includes, for an inner layer (i>1), perceptually uniformly distributed samples on $OW_i$-$P_i$ being obtained by the following procedure:

for each sample of the on the OW line between $OW_i$ and $OW_{(n-i+1)}$, finding a corresponding sample on the OP line by the following rule:

finding a k-th sample from O on the OW line corresponding to a k-th sample from O on the OP line; and, calculating the intersections of line $OW_i$-$P_i$ and the lines connecting the corresponding samples on OW and OP lines to obtain perceptually uniform sample points on $OW_i$-$P_i$.

19. The method of claim 16 wherein calculating the location of additional perceptually uniform samples on each of the layers includes, for an inner layer (i>1), perceptually uniformly distributed samples on $OW_{(n-i+1)}$-$P_i$ being obtained by the following procedure:

for each sample on the OW line between $OW_i$ and $OW_{(n-i+1)}$, finding its corresponding sample of the PW line by the following rule:

finding a k-th sample from O on the OW line corresponding to a k-th sample from P on the PW line; and, calculating the intersections of line $OW_{(n-i+1)}$-$P_i$ and the lines connecting the corresponding samples on OW and PW lines to obtain perceptually uniform sample points on $OW_i$-$P_i$.

20. The method of claim 16 wherein calculating the location of additional perceptually uniform samples on each of the layers includes, for an inner layer (i>1), perceptually uniformly distributed samples on $OW_i$-$S_i$ being obtained by the following procedure:

for each sample on the OW line between $OW_i$ and $OW_{(n-i+1)}$, finding its corresponding sample on the OS line by the following rule:

finding a k-th sample from O on the OW line corresponding to a k-th sample from O on the OS line; and, calculating the intersections of line $OW_i$-$S_i$ and the lines connecting the corresponding samples on OW and OS lines to obtain perceptually uniform sample points on $OW_i$-$S_i$.

21. The method of claim 16 wherein calculating the location of additional perceptually uniform samples on each of the layers includes, for an inner layer (i>1), perceptually uniformly distributed samples on $OW_{(n-i+1)}$-Si being obtained by the following procedure:

for each sample on the OW line between $OW_i$ and $OW_{(n-i+1)}$, finding its corresponding sample on the SW line by the following rule:
  finding a k-th sample from O on the OW line corresponding to a k-th sample from S on the SW line; and,
  calculating the intersections of line $OW_{(n-i+1)}$-$S_i$ and the lines connecting the corresponding samples on OW and SW lines to obtain perceptually uniform sample points on $OW_i$-$S_i$.

22. The method of claim 16 wherein calculating the location of additional perceptually uniform samples on each of the layers includes, for an inner layer (i>1), perceptually uniformly distributed samples on $P_i$-$S_i$ being obtained by the following procedure:
  plotting samples on line PS in the signal space on a horizontal axis of a two-dimensional coordinate system, with point P on the origin;
  constructing a straight line passing through the origin and having a slope equal to the ratio between the length of line segment $S_i$-$P_i$ and that of line segment $PS_{(n-i+1)}$-$PS_i$;
  using the straight line as a transfer function, mapping point PSi on the horizontal axis to $P_i$ on the vertical axis, point $PS_{(n-i+1)}$ on the horizontal axis to $S_i$ on the vertical axis, and every sample on the horizontal axis between $PS_i$ and $PS_{(n-i+1)}$ on line PS to a point between $P_i$ and $S_i$ on the vertical axis; and,
  forming perceptually uniform mapped sample points on the vertical axis line segment $P_i$-$S_i$.

23. The method of claim 16 wherein calculating the location of additional perceptually uniform samples on each of the layers includes finding additional perceptually uniform sample points on the interior of each of the two adjoining triangular faces as follows:
  connecting each sample point vertex on a common, first triangular face edge $P_i$-$S_i$ to sample points on a second edge $S_i$-OW and a third edge $P_i$-OW according to the following rule:
  finding a k-th sample from $P_i$ on the $P_i$-$S_i$ first edge corresponding to a k-th sample from $P_i$ on the $P_i$-OW third edge, and a k-th sample from Si on $P_i$-$S_i$ corresponding to a k-sample from $S_i$ on the $S_i$-OW second edge;
  connecting corresponding sample points on the $P_i$-$S_i$ first edge and the $P_i$-OW third edge, forming a first group of lines;
  connecting corresponding sample points on the $P_i$-$S_i$ first edge and the $S_i$-OW second edge, forming a second group of lines; and,
  making internal interconnection points between the first and second groups of lines perceptually uniform sample points within the triangular faces.

24. The method of claim 23 wherein finding additional perceptually uniform sample points on the interior of each of the two adjoining triangular faces includes a first triangular face having the vertices of $P_i$, $S_i$, and $OW_{(n-i+1)}$.

25. The method of claim 23 wherein finding additional perceptually uniform sample points on the interior of each of the two adjoining triangular faces includes a second triangular face having the vertices of $P_i$, $S_i$, and $OW_i$.

26. The method of claim 14 wherein for the outer most layer (i=1), defining each layer as having two adjoining triangular faces includes finding the two triangular faces as being faces OPS and WPS of the tetrahedron.

* * * * *